United States Patent [19]
Baldursson

[11] Patent Number: 5,722,694
[45] Date of Patent: Mar. 3, 1998

[54] TRANSPARENT ENVELOPE WITH FOLDABLE POCKET FLAP FOR INFORMATION DISPLAY

[76] Inventor: Helgi E. Baldursson, Furugrund 62, 200 Kópavogur, Iceland

[21] Appl. No.: 517,366

[22] Filed: Aug. 21, 1995

[51] Int. Cl.$^6$ .................. G03B 21/64; B42F 7/06
[52] U.S. Cl. .................. 283/116; 281/38; 281/31; 402/79; 402/80 R; 353/120; 353/DIG. 5
[58] Field of Search .............. 353/120, DIG. 5; 283/116; 281/38, 31; 402/79, 80 R; 40/768, 771, 124.1; 229/67.1, 67.2, 72

[56] References Cited

U.S. PATENT DOCUMENTS

| | | | |
|---|---|---|---|
| 781,222 | 1/1905 | Morse | 40/771 |
| 868,758 | 10/1907 | Bexell | 229/67.1 |
| 2,538,894 | 1/1951 | Bender | 40/768 |
| 3,643,363 | 2/1972 | Biro | 281/45 X |
| 3,875,693 | 4/1975 | Pelky | 40/124.1 |
| 4,402,585 | 9/1983 | Gardlund | 353/120 |
| 4,629,349 | 12/1986 | Pitts | 281/31 X |
| 4,771,557 | 9/1988 | Bowman | 40/661 X |
| 4,925,720 | 5/1990 | Hansen | 428/77 |
| 4,991,767 | 2/1991 | Wyant | 281/31 X |
| 5,090,732 | 2/1992 | Kuhns et al. | 281/29 |
| 5,237,355 | 8/1993 | Kiehne et al. | 353/120 |
| 5,266,987 | 11/1993 | Kiehne et al. | 353/120 |
| 5,319,400 | 6/1994 | Herbert et al. | 353/120 |
| 5,335,027 | 8/1994 | Lin et al. | 353/120 |
| 5,371,560 | 12/1994 | Kiehne et al. | 353/120 |
| 5,445,417 | 8/1995 | Bromer et al. | 281/31 X |

FOREIGN PATENT DOCUMENTS 2 567 454  11/1983  France.
WO 94/15254  7/1994  WIPO.

*Primary Examiner*—Frances Han
*Attorney, Agent, or Firm*—John L. Rogitz

[57] ABSTRACT

An envelope includes a transparent sleeve for holding an overhead projector transparency. The envelope further includes at least one transparent flap which is hingedly connected to the sleeve along a long edge thereof. The flap defines a pocket, and a transparent supplemental information sheet or an opaque blocking sheet is inserted into the pocket of the flap for selectively juxtaposing the sheet with the transparency, thereby altering the display.

19 Claims, 2 Drawing Sheets

TRANSPARENT ENVELOPE WITH FOLDABLE POCKET FLAP FOR INFORMATION DISPLAY

FIELD OF THE INVENTION

The present invention relates generally to information display systems, and more particularly to transparent envelopes for displaying information using overhead projectors.

BACKGROUND

A well-known method for displaying information to an audience is to place a transparent slide having information printed thereon (referred to in the art as a "transparency") onto the platen of an overhead projector. A light source is positioned under the platen to illuminate the transparency and thereby create an image of the printed information, and mirrors are mounted on the projector above the platen to redirect the image onto a vertical screen for viewing the information. Alternatively, for small audiences, no overhead projector need be used. Instead, the transparency may be viewed directly.

In any case, various devices for holding transparencies for display have been introduced to increase the effectiveness of the information display. For example, PCT patent application WO 94/15254, assigned to Minnesota Mining and Manufacturing Co. of Saint Paul, Minn., discloses a transparent envelope into which a transparency can be inserted, and the envelope includes one or more opaque flaps that are hingedly attached to the envelope. A flap can be folded over the envelope to juxtapose the flap with the envelope and thereby block light from portions of the transparency sought not to be displayed. When it is desired to display the blocked-out portions, the flap is folded outwardly away from the envelope. In this way, information on a single transparency can be incrementally displayed as appropriate to increase the effectiveness of the presentation. Furthermore, the transparency can be removed from the envelope and the envelope reused with subsequent transparencies.

While useful for its intended purpose, the above-described invention is limited in its application. More particularly, with regard to varying the visual display the opaque flaps can be used only to block and unblock portions of the transparency that is disposed within the envelope. Thus, the only information that can be displayed is information printed on the transparency. Furthermore, because the above-described invention contemplates only a single function, namely, blocking portions of the transparency, no provision is made to remove the opaque flaps from the envelope. As recognized by the present invention, however, it can be desirable not only to simply incrementally display information on the transparency by selectively blocking portions of the transparency, but to permit incrementally overlaying transparent supplemental information sheets onto the displayed transparency. It is further desirable to permit interchangeably overlaying both opaque blocking sheets and transparent supplemental information sheets onto the transparency, without requiring the use of a respective envelope/holder for each sheet.

Accordingly, it is an object of the present invention to provide an envelope for holding a transparency which permits incremental display of information on the transparency. Another object of the present invention is to provide an envelope for holding a transparency which permits information to be overlaid on the displayed transparency. Still another object of the present invention is to provide an envelope for holding a transparency which is easy to use and cost-effective.

SUMMARY OF THE INVENTION

An envelope for holding a primary sheet having information displayed thereon in selective juxtaposition with a secondary sheet includes a transparent rectangular sleeve for removably holding the primary sheet. The sleeve has at least one open edge for receiving the primary sheet therethrough. A transparent rectangular flap is hingedly connected to the sleeve along an edge thereof, and the flap defines a pocket for removably holding the secondary sheet therein. Accordingly, the flap can be moved between a juxtaposed position, wherein the flap is flush against the sleeve to overlay the secondary sheet on the primary sheet, and a distanced position, wherein the flap is not flush against the sleeve such that the secondary sheet is not overlaid on the primary sheet.

In the presently preferred embodiment, the flap includes front and back flap sheets which establish the pocket therebetween and which also define a plurality of edges. In this embodiment, the surface area of the front flap sheet is substantially equal to the surface area of the back flap sheet. Likewise, the sheet includes front and back sleeve sheets for receiving the primary sheet therebetween, and the surface area of the front sleeve sheet is substantially equal to the surface area of the back sleeve sheet. Preferably, the area of each flap sheet is between about fifteen percent and fifty percent (15%–50%), and most preferably 20% –40%, of the area of one of the sleeve sheets.

As disclosed in detail below, the flap and, thus, the pocket, defines opposed short top and bottom edges and opposed long left and right edges. At least one of the long edges of the flap is hingedly connected to the sleeve and at least one of the edges of the pocket is open to receive the secondary sheet therethrough. In one embodiment, the long side edges of the flap are about equal in length to the long side edges of the sleeve. If desired, a transparent tertiary pocket can be formed on the flap to superimpose icons and the like on the images of the primary and secondary sheets.

In an alternate embodiment of the envelope of the present invention, in addition to the transparent flap, at least one single-sheet opaque blocking flap is hingedly connected to the sleeve. In still another embodiment, the flap includes front and back flap sheets defining the pocket therebetween, and the surface area of the front flap sheet is substantially less than the surface area of the back flap sheet.

In another aspect of the present invention, an display system includes an overhead transparency and a supplemental sheet. The system of the present invention further includes an envelope for removably holding the overhead transparency and the supplemental sheet. In accordance with the present invention, the envelope has a juxtaposed configuration, wherein the supplemental sheet is overlaid on the transparency, and a distanced configuration, wherein the supplemental sheet is not overlaid on the transparency. An overhead projector includes a platen for supporting the envelope, and a screen is in light communication with the overhead projector, whereby the overhead projector displays an image of the transparency on the screen.

In yet another aspect of the present invention, an envelope for removably holding a transparency and for removably holding a supplemental sheet has a juxtaposed configuration, wherein the supplemental sheet is overlaid on the transparency. Moreover, the envelope has a distanced position, wherein the supplemental sheet is not overlaid on the transparency.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
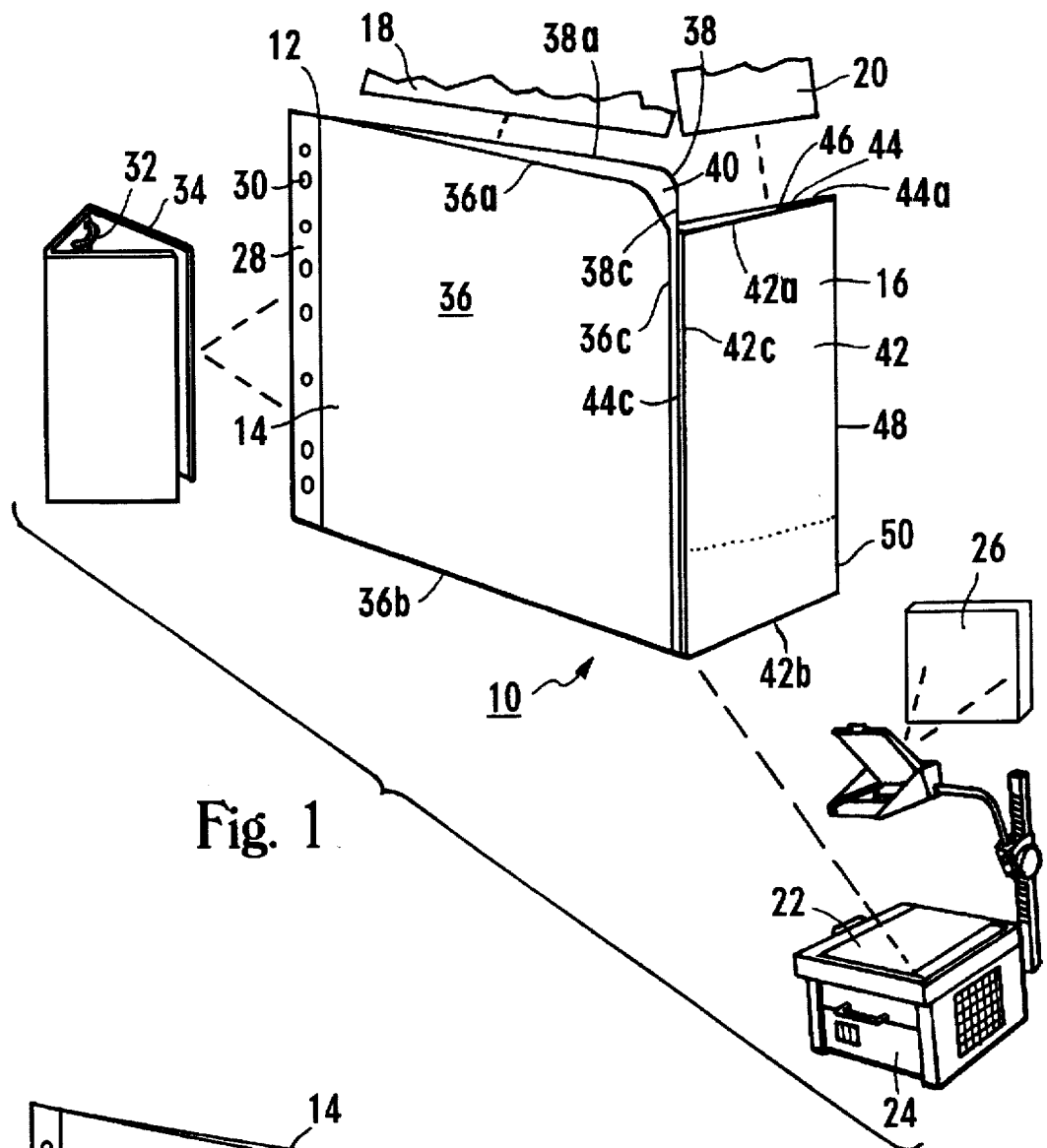
FIG. 1 is a perspective view of the transparent envelope of the present invention, showing the envelope in an exploded relationship with a storage binder and an overhead projector, with the flap of the envelope shown in the distanced position and with portions of the information sheets broken away for clarity.

Referring initially to FIG. 1, a system, generally designated 10, is shown for displaying information. In one exemplary embodiment, the system 10 includes an envelope 12 having a transparent sleeve 14 and at least one transparent flap 16. Preferably, the envelope 12 is made of transparent plastic, such as polypropylene. Alternatively, the envelope 12 can be made of polyester, polyvinylchloride, or other suitable transparent plastic material.

As intended by the present invention, the sleeve 14 removably holds a transparency 18 having information printed or otherwise deposited thereon, while the flap 16 removably holds a supplemental sheet 20. The supplemental sheet 20 may be opaque, or the supplemental sheet 20 may be transparent with information printed or otherwise deposited thereon, depending upon the particular application of the system 10.

As can be appreciated in reference to FIG. 1, the envelope 12 can be positioned on a platen 22 of an overhead projector 24. The projector 24 can be energized to visually display an image of the transparency 18 and supplemental sheet 20 on a vertically-oriented screen 26. Alternatively, the transparency 18 and supplemental sheet 20 can be viewed directly. If desired, an attachment edge 28 of the envelope 12 can have holes 30 formed therein for engaging respective rings 32 of a binder 34 to store and transport the envelope 12.

As intended herein, the sleeve 14 removably holds the transparency 18. Per the present invention, "removably held" means that the transparency 18 can be easily and quickly manually inserted and extracted from the sleeve 14 without curing or otherwise damaging the sleeve 14 or transparency 18. In other words, the transparency 18 is not laminated, bonded, or otherwise permanently attached to the sleeve 14. On the other hand, electrostatic interaction between the transparency 18 and the sleeve 14 may occur, such that the transparency 18 does not easily fall out of the sleeve 14. Nevertheless, the transparency 18 is removably held in the sleeve 14 within the meaning of the present invention, regardless of whether electrostatic interaction occurs between the transparency 18 and the sleeve 14. Likewise, the flap 16 removably holds the supplemental sheet 20.

Figure 2:
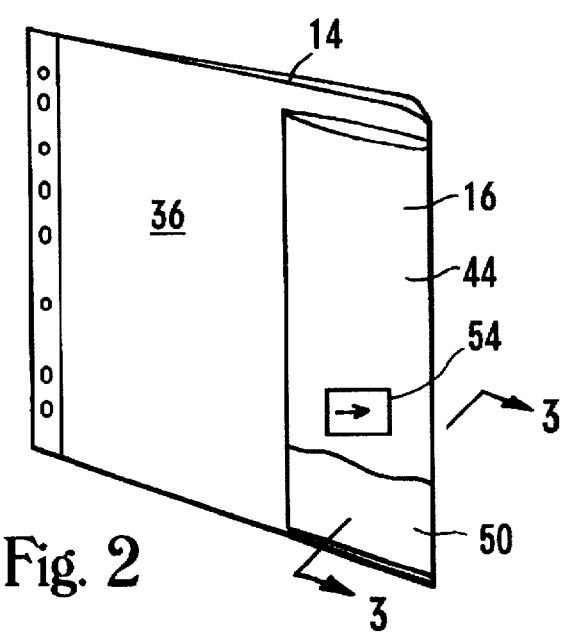
FIG. 2 is a perspective view of the transparent envelope of the present invention, with the flap shown in the juxtaposed position.
Figure 3:
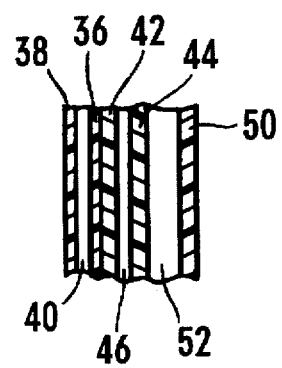
FIG. 3 is a cross-sectional view as seen along the line 3—3 in FIG. 2, with portions broken away.

The details of the envelope 12 may be seen in cross-reference to FIGS. 1–3. As shown best in FIG. 1, the sleeve 14 includes a rectangular front sleeve sheet 36 and a rectangular back sleeve sheet 38, and the surface area of the front sleeve sheet 36 is substantially equal to the surface area of the back sleeve sheet 38. It may be appreciated in cross-reference to FIGS. 1 and 3 that the sleeve sheets 36, 38 establish a space 40 therebetween, and the transparency 18 is removably received in the space 40.

The sleeve sheets 36, 38 define respective top edges 36a, 38a that are juxtaposed with each other. Also, the sleeve sheets 36, 38 define respective bottom edges (only the bottom edge 36b of the front sheet 36 shown in FIG. 1). As shown, the bottom edges are opposed to the top edges 36a, 38a and are juxtaposed with each other. Indeed, per the present invention, the bottom edges of the sleeve sheets 36, 38 are connected together to establish a closed bottom edge for the sleeve 14. To connect the bottom edges together, the bottom edges may be formed unitarily together, or heat-staked, bonded, or otherwise attached to each other by means well-known in the art.

In contrast, the top edges 36a, 38a of the sleeve sheets 36, 38 are not connected, to thereby establish an open edge of the sleeve 14. Consequently, the transparency 18 may be inserted into the sleeve 14 between the top edges 36a, 38a.

FIG. 1 further shows that the sleeve sheets 36, 38 define respective right edges 36c, 38c that are juxtaposed with each other and that are not connected to each other. Consequently, the transparency 18 can be inserted into the sleeve 14 between the right edges 36c, 38c. Moreover, the sleeve sheets 36, 38 define respective left edges that are connected together to establish the attachment edge 28. As shown, the length of the attachment edge 28 is equal to the length of each right edge 36c, 38c of the sleeve sheets 36, 38. Also, the length of each top edge 36a, 38a is equal to the length of the bottom edge 36b, and the right edges 36c, 38c are longer than the bottom edge 36b. Preferably, the dimensions of the sleeve 14 are established to be slightly larger than the transparency 18.

Like the sleeve 14, the flap 16 includes opposed sheets for forming a pocket. More particularly, the flap 16 includes front and back flap sheets 42, 44 which establish a pocket 46 (FIGS. 1 and 3) therebetween. As shown in FIG. 1, the supplemental sheet 20 can be inserted into the pocket 46 and held therein. In the embodiment shown in FIGS. 1–3, the surface area of the front flap sheet 42 is substantially equal to the surface area of the back flap sheet 44. Furthermore, in the presently preferred embodiment the surface area of each flap sheet 42, 44 is between about 15%–50%, and most preferably between about 20%–40%, of the surface area of each sleeve sheet 36, 38.

The flap sheets 42, 44 define respective top edges 42a, 44a that are juxtaposed with each other and that are separate from each other. Stated differently, the top edge of the pocket 46 is open. Also, the flap sheets 42, 44 define respective bottom edges (only the bottom edge 42b of the front flap sheet 42 shown in FIG. 1) which are connected together and which are opposed to the top edges 42a, 44a.

FIG. 1 further shows that the flap sheets 42, 44 define respective right edges 42c, 44c that are juxtaposed with each other and that are not connected to each other. Consequently, the supplemental sheet 20 can be inserted into the pocket 46 between the right edges 42c, 44c. If desired, however, the right edges 42c, 44c can be connected together.

In the presently preferred embodiment, the right edge 44c of the back flap sheet 44 is hingedly attached along its length to the right edge 38c of the back sleeve sheet 38 by means well-known in the art. For example, the right edge 44c of the back flap sheet 44 can be made integrally with the right edge 38c of the back sleeve sheet 38, and the flap 16 then creasedly folded relative to the sleeve 14 along the right edges 38c, 44c. If desired, the resulting creased fold can be perforated along its length to promote hingable movement. Or, the back sheets 38, 44 can be separate pieces of material, with the right edge 44c of the back flap sheet 44 being heat-sealed, adhesively bonded, or otherwise hingedly attached by means well-known in the art to the right edge 38c of the back sleeve sheet 38.

Moreover, the flap sheets 42, 44 define respective left edges that are connected together to establish a closed left edge 48. As shown, the length of the left edge 48 is equal to the length of each right edge 42c, 44c of the flap sheets 42, 44. In turn, the length of each right edge 42c, 44c of the flap sheets 42, 44 is about equal to, i.e. , is within zero centimeters to four centimeters (0-4 cm) of, the length of the right edge 38c of the back sleeve sheet 38. In other embodiments, the length of each right edge 42c, 44c of the flap sheets 42, 44 is markedly shorter than, i.e., is more than four centimeters (4 cm) shorter than, the length of the right edge 38c of the back sleeve sheet 38.

Also, the lengths of the top edges 42a, 44a of the flap sheets 42, 44 are equal to the length of the bottom edge 42b, and the right edges 42c, 44c are longer than the bottom edge 42b. Preferably, the dimensions of the flap 16 are established to be slightly larger than the supplemental sheet 20. If desired, as best shown in FIGS. 2 and 3 a rectangular transparent tertiary sheet 50 can be bonded at three of its edges to the back flap sheet 44 to establish a tertiary pocket 52 on the flap 16.

With the above combination of structure in mind, it may now be appreciated that the flap 16 is hingedly connected to the sleeve 14 for foldable movement between a juxtaposed position shown in FIG. 2 and a distanced position shown in FIG. 1. In the juxtaposed position shown in FIG. 2, the flap 16 is flush against the sleeve 14 to establish a juxtaposed configuration of the envelope 12, wherein the supplemental sheet 20 is overlaid on the transparency 18. It will be appreciated that when the supplemental sheet 20 is opaque, the portion of the transparency 18 that is blocked by the supplemental sheet 20 is hidden from view. On the other hand, when the supplemental sheet 20 is transparent and has information printed thereon, the information on the supplemental sheet 20 is superimposed on the image of the transparency 18.

In contrast, in the distanced position shown in FIG. 1, the flap 16 is not flush against the sleeve 14, and a distanced configuration of the envelope 12 is thereby established. In the distanced configuration, the supplemental sheet 20 is not overlaid on the transparency 18. Accordingly, when the supplemental sheet 20 is transparent and has information printed thereon, the information on the supplemental sheet 20 is not visible on the screen 26 (FIG. 1). If desired, a transparent plastic symbol and/or icon tab 54 can be disposed in the tertiary pocket 52 for superimposition of the tab 54 on the image of the transparency 18, when the envelope 12 is in the juxtaposed configuration. Additional tertiary pockets can be established in accordance with the principles disclosed above.

Figure 4:
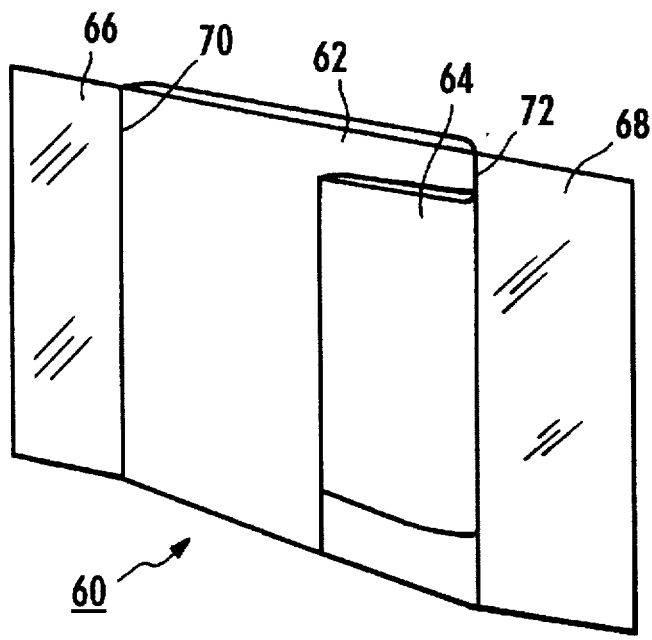
FIG. 4 is a perspective view of an alternate embodiment of the envelope of the present invention, showing two foldable blocking flaps and a foldable pocket flap.

Now referring to FIG. 4, an envelope, generally designated 60, is shown having a sleeve 62 for holding a transparency and a flap 64 hingedly connected to the sleeve 62 for holding a supplemental sheet between distanced and juxtaposed positions. The envelope 60 shown in FIG. 4 is in all essential respects identical in configuration and operation to the envelope 12 shown in FIGS. 1–3, except that left and right rectangular single-sheet opaque blocking flaps 66, 68 are hingedly connected to respective side edges 70, 72 of the sleeve 62. Accordingly, it will be appreciated that the blocking flaps 66, 68 can be individually moved between distanced and juxtaposed position to selectively block portions of the image of the transparency and supplemental sheet that are held in the envelope 60.

Figure 5:
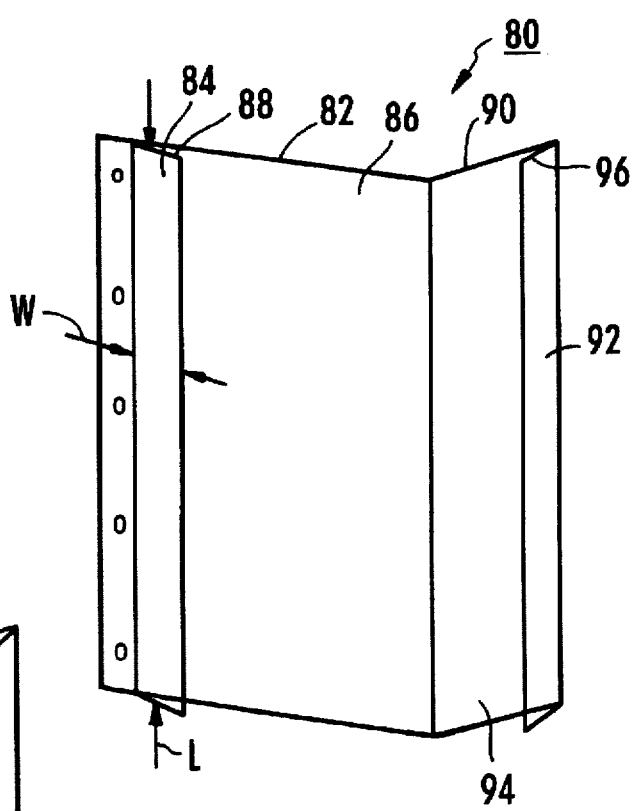
FIG. 5 is a perspective view of yet another alternate embodiment of the envelope of the present invention, showing a foldable single sheet flap having a foldable holding strip, with both the flap and folding strip having a length about equal to the length of the envelope.

FIG. 5 shows still another embodiment of the envelope of the present invention, generally designated 80. As shown, the envelope 80 includes a sleeve 82 that is established by front and back sleeve sheets 84, 86. As further shown, the surface area of the front sleeve sheet 84 is significantly less than the surface area of the back sleeve sheet 86. More particularly, the length "L" of the front sleeve sheet 84 is about equal to the length of the back sleeve sheet 86, but the width "W" of the front sleeve sheet 84 is markedly shorter than the width of the back sleeve sheet 86. A sleeve pocket 88 is defined between the sleeve sheets 84, 86, and the long edge of a transparency (not shown) is removably positionable in the sleeve pocket 88. In accordance with the present invention, the transparency is frictionally held within the sleeve pocket 88, i.e., by electrostatic cooperation between the transparency and sleeve 82. In this embodiment, the sleeve sheets 84, 86 advantageously can be made of polyvinylchloride.

Additionally, the envelope 80 includes a flap 90 that is established by front and back flap sheets 92, 94. As was the case with the sheets 84, 86 of the sleeve 82, the front flap sheet 92 is as long as the back flap sheet 94, but is much less wide than the back flap sheet 94. Accordingly, the surface area of the front flap sheet 92 is substantially less than the surface area of the back flap sheet 94. A flap pocket 96 is established between the flap sheets 92, 94, and the long edge of a supplemental sheet is held within the flap pocket 96 by electrostatic cooperation between the flap 90 and supplemental sheet.

Figure 6:
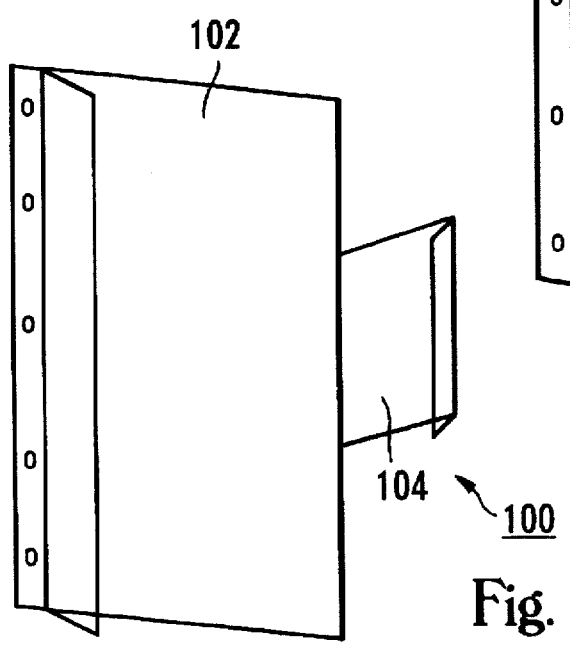
FIG. 6 is a perspective view of still another alternate embodiment of the envelope of the present invention, showing a foldable single sheet flap having a foldable holding strip, with both the flap and the holding strip having a length substantially shorter than the length of the envelope.

FIG. 6 shows still another embodiment of the envelope of the present invention, generally designated 100, having a sleeve 102 and a flap 104. It will readily be appreciated that the envelope 100 shown in FIG. 6 is in all essential respects identical to the envelope 80 shown in FIG. 5, except that the long edge of the flap 104 of the envelope 100 shown in FIG. 6 is substantially shorter than the long edge of the sleeve 102.

While the particular TRANSPARENT ENVELOPE WITH FOLDABLE POCKET FLAP FOR INFORMATION DISPLAY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. An envelope for holding a primary sheet having information displayed thereon in selective juxtaposition with a secondary sheet, comprising:

a transparent rectangular sleeve for removably holding the primary sheet and having at least one open edge for receiving the primary sheet therethrough; and a transparent rectangular flap defining a pocket for removably holding the secondary sheet therein, the flap being hingedly connected to the sleeve along an edge thereof for movement between a juxtaposed position, wherein the flap is flush against the sleeve to overlay the secondary sheet on the primary sheet, and a distanced position, wherein the flap is not flush against the sleeve such that the secondary sheet is not overlaid on the primary sheet, the flap covering one half or less of the sleeve in the juxtaposed position.

2. The envelope of claim 1, wherein the flap includes front and back flap sheets defining the pocket therebetween and a plurality of edges, and the surface area of the front flap sheet is substantially equal to the surface area of the back flap sheet.

3. The envelope of claim 2, wherein the sleeve includes front and back sleeve sheets for receiving the primary sheet therebetween, and the surface area of the front sleeve sheet is substantially equal to the surface area of the back sleeve sheet.

4. The envelope of claim 3, wherein the pocket defines opposed top and bottom edges and opposed left and right edges, at least one of the edges of the flap being hingedly connected to the sleeve and at least one of the edges of the pocket being open to receive the secondary sheet therethrough.

5. The envelope of claim 4, wherein the sleeve defines opposed top and bottom edges and opposed left and right side edges, the side edges being longer than the top and bottom edges, the flap being hingedly attached to one of the side edges of the sleeve, the left and right edges of the pocket of the flap being about equal in length to the side edges of the sleeve.

6. The envelope of claim 5, wherein the area of each flap sheet is between about fifteen percent and fifty percent (15%–50%) the area of one of the sleeve sheets.

7. The envelope of claim 6, further comprising a tertiary pocket formed on the flap.

8. The envelope of claim 7, further comprising at least one single-sheet opaque blocking flap hingedly connected to the sleeve.

9. The envelope of claim 4, wherein the sleeve defines opposed top and bottom edges and opposed left and right side edges, the side edges being longer than the top and bottom edges, the flap being hingedly attached to one of the side edges of the sleeve, the left and right edges of the pocket of the flap being substantially shorter than the side edges of the sleeve.

10. The envelope of claim 1, wherein the flap includes front and back flap sheets defining the pocket therebetween, and the surface area of the front flap sheet is substantially less than the surface area of the back flap sheet.

11. An information display system, comprising:

an overhead transparency and a supplemental sheet smaller than the overhead transparency;

an envelope for removably holding the overhead transparency and the supplemental sheet, the envelope having a juxtaposed configuration, wherein the supplemental sheet is overlaid on the transparency such that the supplemental covers only a part of the transparency, and a distanced configuration, wherein the supplemental sheet is not overlaid on the transparency;

an overhead projector including a platen for supporting the envelope; and a screen in light communication with the overhead projector, whereby the overhead projector displays an image of the transparency on the screen.

12. The system of claim 11, wherein the envelope comprises:

a transparent rectangular sleeve for removably holding the transparency and having at least one open edge for receiving the transparency therethrough; and a transparent rectangular flap defining a pocket for removably holding the supplemental sheet therein, the flap being hingedly connected to the sleeve along an edge thereof for movement between a juxtaposed position, wherein the flap is flush against the sleeve to establish the juxtaposed configuration of the envelope, and a distanced position, wherein the flap is not flush against the sleeve to establish the distanced configuration of the envelope.

13. The system of claim 12, wherein the flap includes front and back flap sheets defining the pocket therebetween, the surface area of the front flap sheet being substantially equal to the surface area of the back flap sheet, the pocket of the flap defining opposed top and bottom edges at least one of which is open, one of edges of the flap being hingedly connected to the sleeve.

14. The system of claim 13, wherein the sleeve defines opposed top and bottom edges and opposed left and right side edges, the side edges being longer than the top and bottom edges, the flap being hingedly attached to one of the side edges of the sleeve, the left and right edges of the pocket of the flap being about equal in length to the side edges of the sleeve, the area of each flap sheet being between about fifteen percent and fifty percent (15%–50%) the area of one of the sleeve sheets.

15. The system of claim 14, further comprising at least one single-sheet opaque blocking flap hingedly connected to the sleeve.

16. The system of claim 13, wherein the sleeve defines opposed top and bottom edges and opposed left and right side edges, the side edges being longer than the top and bottom edges, the flap being hingedly attached to one of the side edges of the sleeve, the left and right edges of the pocket of the flap being substantially shorter than the side edges of the sleeve.

17. The system of claim 12, wherein the flap includes front and back flap sheets defining the pocket therebetween, and the surface area of the front flap sheet is substantially less than the surface area of the back flap sheet.

18. An envelope for removably holding a transparency and for removably holding a supplemental sheet, the envelope having a juxtaposed configuration, wherein the supplemental sheet is overlaid on the transparency, and a distanced configuration, wherein the supplemental sheet is not overlaid on the transparency, the envelope including:

a transparent rectangular sleeve for removably holding the transparency and having at least one open edge for receiving the transparency therethrough, the sleeve defining a surface area; and a transparent rectangular flap defining a pocket for removably holding the supplemental sheet therein, the flap being hingedly connected to the sleeve along an edge thereof for movement between a juxtaposed position, wherein the flap is flush against the sleeve to establish the juxtaposed configuration of the envelope, and a distanced position, wherein the flap is not flush against the sleeve to establish the distanced configuration of the envelope, the flap defining a surface area smaller than the surface area of the sleeve.

19. The envelope of claim 18, wherein the flap includes front and back flap sheets defining the pocket therebetween, the surface area of the front flap sheet being substantially equal to the surface area of the back flap sheet, the pocket of the flap defining opposed top and bottom edges and opposed left and right edges, the flap being hingedly connected to the sleeve and at least one of the edges of the pocket being open to receive the supplemental sheet therethrough.

* * * * *